United States Patent Office 3,303,090
Patented Feb. 7, 1967

3,303,090
COMPOSITION AND METHOD FOR CONTROLLING NEMATODES WITH ORGANIC METAL CHELATES
Clarence W. Huffman, Glenview, and James C. Engibous, Mount Prospect, Ill., and Joseph B. Skaptason, Kansas City, Mo., assignors to International Minerals & Chemical Corporation, a corporation of New York
No Drawing. Filed Mar. 21, 1963, Ser. No. 266,804
15 Claims. (Cl. 167—22)

This invention relates to improvement of the art of controlling parasitic plant attacking nematodes. In its major aspect this invention relates to the control of plant attacking nematodes through the use of systemic nematocides. In its preferred aspect this invention relates to a process for controlling parasitic plant attacking nematodes by applying to such plants a non-toxic nematocidally effective amount of selected organic chelates of cadmium and silver.

Nematodes are tiny worm-like organisms that belong to the animal kingdom. They have no close relatives and are quite different from other types of animals called worms. Most nematodes live in the soil, although some species are known to exist in the fresh waters of rivers, ponds, and lakes and in the salt water of the sea. Although not all soil-living nematodes are pests, many of the soil species are plant parasites. Nearly all of the crops and ornamental plants grown in the world can be attacked by plant parasitic nematodes. Nematodes are particularly destructive to crops in areas of sandy soil and mild climatic conditions.

Nematodes may do some direct damage to the stems and leaves of plants. Mostly, however, they do their dirty work below the soil surface. Nematodes damage plant roots by killing the living cells or interfering with their normal functioning, viz., by causing the plant to "react" with the formation of galls or knots on the roots. Plants injured by nematodes sometimes show characteristics of nutritional deficiencies. Nematode-infested plants are frequently deficient in certain essential elements. This results in stunting, discoloration of the leaves, premature defoliation, and occasionally early death of the plant. Nematode-infested plants also suffer sometimes from water deficiency and may show severe wilting. Root symptoms include knots, root decay, an increase in the number of roots, failure of roots to elongate, and a combination of these symptoms. Nematodes reduce the value of crops by decreasing yield and lowering the quality of the crops. For example, they may damage root crops such as carrots and Irish potatoes so badly that they are not saleable. As an interesting historical note, the nematode is suspected of having caused the disappearance of two civilizations, the Mayan in Mexico and the Khmer in Indo-China.

The methods used in the past for controlling plant parasitic nematodes are many and varied. The four main methods include (1) crop rotation and other cultural practices; (2) breeding nematode-resistant plant varieties, which has been only partially successful; (3) the inspection, quarantine and therapeutic treatment of plant stocks to insure nematode-free material; and (4) chemical treatment, primarily in the form of soil fumigation. Chemical treatment and crop rotation have proven to be the most useful measures employed. Although chemical treatment by soil fumigation has been the most effective, it is subject to certain disadvantages. First, it is expensive. Secondly, fumigants kill plants and it is necessary to wait a week or two between fumigation and seed planting or plant setting. Further, application is not simple. It requires special equipment and the physical condition of the soil and the temperature have an effect on the success of the treatment.

The U.S. Department of Agriculture as well as numerous suppliers of agricultural chemicals have been working on better methods and materials for the control of plant attacking nematodes. In the main these efforts have been directed toward improvements in the procedures above indicated as having known effectiveness. While it has been recognized that an ideal solution might reside in the use of materials which could be applied to the foliage or stems of growing plants in such conventional forms as sprays, dusts, pastes, etc., no one has succeeded in finding an effective agent. In accordance with the present invention we have found that selected organic chelates of cadmium and silver can be employed effectively as systemic nematocides in the control of parasitic plant attacking nematodes. That is, we have discovered a class of compounds which when applied to the foliage and stems of growing plants are absorbed into said plants and systemically translocated to areas where nematodes choose to attack, primarily the roots, and thereby repel and/or eventually kill nematodes attacking said plants.

It is, therefore, an object of the present invention to provide improvements in the art of controlling plant-attacking nematodes.

It is another object of this invention to provide a class of compounds useful as systemic nematocides in the control of plant-attacking nematodes.

It is a further object of this invention to provide an improved method for controlling parasitic plant-attacking nematodes by applying to plants subject to such attack compounds capable of being systemically translocated to the sites of attack.

Additional objects of this invention will be apparent from the description which follows.

In accordance with the present invention, growing plants can be protected from parasitic plant attacking nematodes by applying to said plants, preferably to the foliage and to the stems, a non-phytotoxic nematocidally effective quantity of a systemically translocatable organic chelate of a metal selected from the group consisting of cadmium and silver and an organic compound selected from the group consisting of polyketones, aminocarboxylic acids and the sodium, potassium or ammonium salts thereof. Chelates are well defined organometallic compounds characterized by the presence of ring structure of which the metal is a part. For a more detailed discussion of chelates, reference is made to "Chemistry of the Metal Chelate Compounds" by Martell and Calvin, Prentiss Hall, Inc., New York, 1952. In general, the chelates useful in accordance with the present invention can be prepared by reacting cadmium or silver in the ionic form, such as in a salt, with a selected organic chelate former.

Typical inorganic cadmium and silver compounds which can be used to form the chelates useful in the present invention include cadmium chloride, cadmium nitrate, cadmium sulfate, cadmium formate, cadmium acetate, cadmium bromide, cadmium thiocyanate, cadmium iodide, cadmium pyrophosphate, silver nitrate, silver sulfate, silver fluoride, and silver silicofluoride. Typical of polyketones which can be reacted with the cadmium and silver salts above noted include acetylacetone (2,4-pentanedione), diacetyl, 2,4-diketohexane, 2,4-diketooctane, 2,4-diketodecane, 2,4-diketododecane, 2,4-diketotetradecane, 2,4-diketohexadecane, 2,4-diketooctadecane, etc. The preferred polyketones are preferably diketones wherein the keto groups are connected to a common carbon atom. Examples illustrative of the aminocarboxylic acids which can be used to prepare chelates from the above mentioned cadmium and silver salts include ethylenediaminetetraacetic acid (EDTA), diethylenetriamine pentaacetic acid, N-($\beta$-hydroxyethyl)ethylenediamino triacetic acid, N,N-bis($\beta$-hydroxyethyl)ethylenediamino diacetic acid, nitrilotriacetic acid, glutamic acid, aspartic acid, pyrrolidonecarboxylic acid and the sodium, potassium, or ammonium salts of said acids. Optically active (D- or L-), racemic (DL), or meso forms of the amino acids can be used. Preferred chelates useful in accordance with the present invention include cadmium acetylacetonate, cadmium-EDTA, cadmium-pyrrolidonecarboxylic acid, silver acetylacetonate, silver-EDTA and silver-pyrrolidonecarboxylic acid. These compounds can be prepared by conventional procedures known in the art and no special techniques are required for the preparation of these metal chelates.

The metal chelates useful in accordance with the present invention may be employed in the form of aqueous solutions or as emulsions, in the form of pastes or in the form of wettable powders and dusts. When used as dusts, conventional sticker materials may be incorporated. Certain of the chelates such as cadmium acetylacetonate are not very soluble in water and are, hence, more usefully employed as wettable powders. The preferred practice is to formulate the active agents in physical forms which are consistent with the solubility characteristics of the selected chelate. It will be appreciated that the carrier employed for the active agent must be one that is physiologically compatible with the biological system of the plant being treated. Thus, phytotoxic carriers are to be avoided. The determination of the phytotoxicity of any particular diluent or carrier for the active agent is a matter which can be easily determined by the experienced formulator.

Since several of the metal chelates useful in accordance with the present invention are only sparsely soluble in water, it has been found advantageous to incorporate an emulsifying agent into the composition, which compositions may be either liquid or dry. Emulsifying agents can be either non-ionic, anionic, or cationic in character. Preferred emulsifiers are of the non-ionic type, as for example, commercial non-ionic emulsifiers sold under the trade names Tween 80; Span 85; Triton X-172; and Triton X-155. It will be understood that inert powders such as talc, inert clays such as attapulgite, kaolin, bentonite, and the like can be employed. A preferred wettable powder composition useful in accordance with the present invention contains, by weight, 50% cadmium acetylacetonate, 48% Pyrax ABB, and 2% Tween 80. Pyrax ABB is a finely divided pyrophyllite. Tween 80 is a polyoxyethylene condensate of a sorbitan-fatty acid ester.

The concentration of the metal chelate nematocide employed for effective results can vary within wide limits depending upon such factors, among others, as the nature of the plant being treated, the time of application and the climatic conditions pertaining. It should be obvious that excessive quantities of the active chelates are not to be employed since this could result in the death of the plant. We have found that the composition applied to the plant is nematocidally effective when it contains in the range between about 2 to about 8,000 parts per million of chelate, and preferably from about 1,000 to about 4,000 parts per million. The composition applied is used in conventional amounts; that is, in quantities such that the material just begins to run off of the leaves and stems when used as a foliar spray. It is also possible to excise a stem, branch, or trunk, as for example, with citrus trees and bushes, and apply over such excision a paste containing the chelate in lanolin or petrolatum in the indicated concentration range.

In general, the quantity of organic metal chelate which is nematocidally effective is related to the solubility or absorbability of the particular metal chelate in the physiological fluids of the plant system. Thus, when the metal chelate is relatively water insoluble, as in the case of cadmium acetylacetonate, a higher concentration of application is preferred. More soluble metal chelates obviously can be employed in lesser concentrations. It will be appreciated that conditions will vary from plant to plant and from chelate to chelate. However, it is a simple matter, well within the skill of the average worker in this field, to determine the optimum concentration to be employed in any given set of circumstances.

When using the metal chelate compounds of the present invention for plant attacking nematode control, we have found that it is desirable to employ several applications, for example, up to about four, usually at intervals of from about three to about ten days, preferably about seven days. Experience has indicated that the effectiveness of such treatment is not immediately apparent and manifestation may take as long as four or five months when the infestation of the soil or plant is heavy. This factor may have particular significance in the case of plants or trees having a long life, as for example ornamental bushes and citrus trees. In the case of plants which are normally transplanted, as for example, tomatoes, spraying is usually done after the plants have had an opportunity to overcome the initial shock of transplantation.

In a preferred modification of the present invention cadmium acetylacetonate is formulated into a wettable powder containing, by weight, 50% cadmium acetylacetonate, 46% by weight of Barden clay, 2% of Marasperse N (a lignosulfonate dispersant available from Marathon Division of American Can Company) and 2% of Ingepon P-77, a methyl tauride anionic emulsifier. This wettable powder is admixed with agitation in water to form a slurry or suspension containing about 4,000 parts per million of cadmium acetylacetonate. This slurry or suspension is sprayed to the point of run-off times at 10-day intervals to the foiliage of Coral Bell azaleas infested with stubby root nematodes. This treatment results in a considerable reduction of the stubby root nematodes infesting the Coral Bell azaleas.

The following examples are intended to illustrate the underlying principles of the present invention and are not to be construed as unduly limiting thereof.

*Example I*

Cadmium acetylacetonate was prepared employing a tagged or radioactive $Cd^{115}$ and was in turn made into a wettable powder containing 50% by weight cadmium acetylacetonate, 46% Barden clay, 2% Marasperse N and 2% Igepon T-77. The purpose of this test was to determine whether or not the active ingredient was translocated within the plant. The wettable powder described above was mixed with water to form a slurry which was sprayed onto the leaves of growing tomato and bean plants. Sufficient slurry was provided so that each plant was treated with about 0.0005 mg. of $Cd^{115}$. Radioautograms were made of plants thus treated. It was evident in the radioautograms that the $Cd^{115}$ was translocated from the leaves to the roots of the tomatoes and the beans. We were surprised to find that we could not detect the $Cd^{115}$ in the fruit which grew on the treated tomato plants. This fact enhances the value of our treatment for tomatoes.

Radish, broccoli and English peas were sprayed with a 2,000 p.p.m. and a 4,000 p.p.m. water suspension of the wettable powder formulated as above described, 4, 5, and 5 times, respectively, for each plant. The cadmium contained in the cadmium acetylacetonate was not, however, radioactive. The cadmium content in the edible parts of each plant is set forth in Table I below.

TABLE I

| | Treatment, p.p.m. | Dry Material, p.p.m. Cd |
|---|---|---|
| Radish | 0<br>2,000<br>4,000 | 0<br>2.5<br>4.4 |
| Broccoli | 0<br>2,000<br>4,000<br>[1] 4,000 | 0<br>0<br>8.6<br>13.2 |

| | Treatment, p.p.m. | Peas, p.p.m. Cd | Roots, p.p.m. Cd |
|---|---|---|---|
| English Peas | 0<br>2,000<br>4,000 | 0<br>0<br>5.5 | 0<br>2.9<br>7.7 |

Another group of English peas was sprayed with a 4,000 p.p.m. cadmium acetylacetonate water suspension as described 0 to 5 times. The edible portion of the peas and the roots were analyzed for cadmium. The results are set forth in Table II.

TABLE II

| | Times Sprayed | p.p.m. Cd (dry material) | |
|---|---|---|---|
| | | Peas | Roots |
| English Peas | 0<br>1<br>2<br>3<br>4<br>5 | 0<br>0<br>0<br>0<br>0<br>57 | 0<br>0<br>0<br>0<br>2.8<br>10.2 | foiliage of Coral Bell azaleas which were naturally infested with stubby root nematodes (*Trichodorus christiei*). Application was made by spraying the foilage to the point of run-off on 3 occasions at 10 day intervals. The results of this treatment are set forth in Table III as follows.

TABLE III

| Chemical | Concentration, p.p.m. | Estimated Population of Stubby Root Nematodes | | Population Increase |
|---|---|---|---|---|
| | | Before Treatment | After Treatment | |
| Cadmium Acetylacetonate | 2,000 | 278 | 6,565 | [1] 23 |
| Do | 4,000 | 1,753 | 718 | [2] (−0.4) |
| Do | 8,000 | 1,032 | 4,106 | [1] 4 |
| None (Control) | | 338 | 10,550 | [1] 31 |

[1] Fold.
[2] Decrease.

It can be seen from the above data that the cadmium acetylacetonate was most effective when applied to azaleas at a concentration rate of 4,000 p.p.m. and was significantly effective at the 2,000 p.p.m. rate, although not as strikingly so as at the rate of 8,000 p.p.m.

*Example III*

Tobacco plants of transplanting size from the greenhouse were set in 4 inch clay pots. After the plants had started growing they were sprayed three times, the second four days after the first and the third two days after the second, with a suspension of the wettable cadmium acetylacetonate powder described in Example II at the various concentrations shown in Table IV following. Four replicates, each with a single plant in one pot, were treated. Root knot galls from tomato roots infected with *Maloidoyne acrita* were added to each pot in uniform amounts 11 days after the last spray treatment. The tobacco plants were washed free from the soil and examined carefully 45 days after being infected with the nematodes. The results of this treatment are set forth in Table IV below.

TABLE IV

| | Concentration, p.p.m. | Number of root knot galls per plant | | | | |
|---|---|---|---|---|---|---|
| | | Pot 1 | Pot 2 | Pot 3 | Pot 4 | Av. |
| Cadmium Acetylacetonate | 2 | 10 | 1 | 7 | 4 | 5.5 |
| Do | 4 | 48 | 48 | 68 | 0 | 41.0 |
| Do | 8 | 0 | 57 | 0 | 1 | 14.5 |
| Control not treated | | 12 | 85 | 75 | 55 | 56.7 |

From the analyses it can be seen that the cadmium is translocated to the edible portion of the radish (roots), broccoli and English peas even though in very small concentrations. The roots of the English peas that had been sprayed 4 to 5 times with 2,000 and 4,000 p.p.m. of the cadmium acetylacetonate did contain cadmium. The higher the spray concentration, the higher the cadmium concentration in the roots.

*Example II*

A cadmium acetylacetonate-containing wettable powder, as described in Example I, except that the cadmium was not radio-actively tagged, was further formulated into suspensions containing 2,000; 4,000; and 8,000 p.p.m. respectively. The slurries containing these three different concentrations were applied, in 8 replications, to the

*Example IV*

The test work reported in this example in essence divides itself broadly into two parts in which the amount of Root Knot inoculum was varied with one series having a very high soil or Root Knot inoculum potential while the other series represented a soil with only a minimum or moderate inoculum potential. In the case of the former, the Root Knot infested soil was diluted at a ratio of 1 to 4 with ordinary potting soil whereas the medium inoculum potential was one in which the inoculum had been diluted at a rate of one to eight with ordinary potting soil. Infinite care was taken in thoroughly admixing the soil prior to use, in an effort to obtain uniformity of response. Also, precautions were taken in watering in order to also have this as uniform as possible throughout the period of the test work.

The general procedure was to transplant two-week old tomato seedlings, grown in vermiculite, into the Root Knot infested soil and permit growth to take place sufficient for good establishment of the seedlings in the soil as well as to permit incipient infection to occur prior to initiation of the spray schedule. In the case Test No. 1, plants were not sprayed until sixteen days after transplanting, at which time the plants were approximately three to four inches in height and very heavily infected with Root Knot. In Test No. 1 the spray schedule, which started sixteen days after transplanting, included four sprayings at seven day intervals. In Test No. 2, the spray schedule, which started seven days after transplanting, involved three sprayings at seven day intervals.

Cadmium acetylacetonate, cadmium EDTA, and silver EDTA were prepared and used as 50% wettable powders for spraying purposes. Silver acetylacetonate was prepared and used as a 25% wettable powder for spraying purposes. Spraying was carried out using precision turntable equipment with 30 ml. of spray suspension being used for three pots for the first two sprays which was increased to 50 ml. per three pots for the third and fourth spray because of the increased plant size.

Harvesting was accomplished by carefully removing the individual plants from their respective pots and thoroughly washing them under a heavy stream of water in order to have as much root material, and as clean material as possible, for detailed examination of the number and the size of the galls present on the root system. A summation of all the data in condensed form is presented in Table V.

were formulated into a wettable powder having a composition identical with that described for the composition used in Example I except that silver acetylacetonate, silver-L-pyrrolidonecarboxylic acid and cadmium-L-pyrrolidonecarboxylic acid were used as the active ingredients therein.

The tomato plants were subjected to spraying in four tests involving application at different concentration rates. The schedule of spraying dates, spray concentrations and date of root nema population counts is given in Table VI.

TABLE VI.—SPRAY SCHEDULE, CONCENTRATION & OBSERVATION

| Test No. 1 | | | Test No. 2 | | |
|---|---|---|---|---|---|
| Spray date | Conc., p.p.m. | Plate date | Spray date | Conc., p.p.m. | Plate date |
| 8/9 | 200 | 8/31 | 8/12 | 200 | 8/23 |
| 8/12 | 200 | 8/31 | 8/18 | 200 | 8/24 |
| 8/18 | 200 | 8/31 | 8/25 | 200 | 8/28 |
| 8/29 | 200 | 8/31 | | | |

| Test No. 3 | | | Test No. 4 | | |
|---|---|---|---|---|---|
| 8/24 | 400 | 8/31 | 8/29 | 1,000 | 8/31 |
| 8/28 | 800 | 8/31 | | | |

In the evaluation procedure entire plants were removed from their pots and the roots thoroughly washed under a heavy stream of water. Root tissue containing galls was

TABLE V

| Chemical | Inoculum Potential | Number of Spray Appl. | Dosage, p.p.m. | Percent Control [1] |
|---|---|---|---|---|
| Cadmium Acetylacetonate | Heavy | Four | 2,000 | 80 |
|  | do | do | 1,000 | 70 |
| Silver Acetylacetonate | Heavy | do | 2,000 | 82 |
|  | do | do | 1,000 | 48 |
| Silver, EDTA | Heavy | do | 2,000 | 13 |
|  | do | do | 1,000 | 27 |
| Cadmium, EDTA | Heavy | do | 2,000 | 77 |
|  | do | do | 1,000 | 0 |
| Cadmium Acetylacetonate | Medium | Three | 1,000 | 77 |
| Silver Acetylacetonate | do | do | 1,000 | 78 |
| Silver, EDTA | do | do | 1,000 | 0 |
| Cadmium, EDTA | do | do | 1,000 | [2] 83 |

[1] Weighted Plant Aver.
[2] Only a few plants.

*Example V*

In this example a large number of tomato plants were transplanted into a prepared soil infected with root knot nematodes. The soil was prepared by mixing one part of a highly infected soil with ten parts of ordinary potting soil and allowing a curing period of two weeks. The tomato plants were started approximately one month before a spraying schedule, to be described hereinafter, was started. This period permitted the plants to become heavily infected with root knot and to be of a good size for spraying and handling. The active ingredients tested then excised from the plants and plated out on agar-agar plates. Any living nematodes, either from within the galls or from the egg cases themselves, emerged and distributed themselves in a random pattern over the entire agra plate. Quantitative measurements were made by making ten random population counts per plate per microscopic field. Care was taken in plating out the same amount of root knot tissue from each plant and into each plate. The data obtained is presented in summary form in Table VII.

TABLE VII.—EFFECT OF NUMBER OF SPRAY APPLICATIONS AND CHEMICAL ACTIVITY ON ROOT KNOT NEMATODE POPULATION ISOLATED FROM ROOT TISSUE

| Chemical | Viable Population Count | | | | | | Grand Average for Chemicals |
|---|---|---|---|---|---|---|---|
| | 4 sprays | 3 sprays | | | 2 sprays | 1 spray | |
| Control | 34.6 | 28.0 | 52.4 | 17.2 | 47.7 | 47.7 | 38.0 |
| Silver-L-pyrrolidonecarboxylic acid | 29.4 | 7.5 | 11.8 | 22.9 | 8.5 | 25.0 | 17.5 |
| Cadmium-L-pyrrolidonecarboxylic acid | 26.6 | 10.3 | 10.5 | 13.3 | 8.8 | 33.9 | 17.2 |
| Silver acetylacetonate | 2.4 | 0 | 0.2 | 0 | 5.6 | 6.9 | 2.5 |

On the average, all three of the chemicals tested showed a reduction in the population of viable nematodes isolated from the root tissues (galls) of treated tomato plants. On the average silver-L-pyrrolidonecarboxylic acid and cadmium-L-pyrrolidonecarboxylic acid accounted for a reduction of 54% of viable nema, and silver acetylacetonate caused a reduction of 94% of viable nema. In the case of silver acetylacetonate, 3 and 4 foliar applications consistently reduced population counts more than one or two spray applications.

The experimental evidence supports the conclusion that the active ingredients are transported downward to the root system and in turn affects or reduces the viability of nematodes within the root tissue.

Observations made during the tests indicate that at the dosage levels and frequency of applications employed, there were no harmful effects to the plants.

While this invention has been described and exemplified in terms of its preferred modifications, those skilled in the art will appreciate that variations can be made without departing from the spirit and scope of the invention.

We claim:

1. A plant systemic nematocidal composition comprising a solid, inert physiologically compatible carrier and a non-phytotoxic nematocidally effective quantity of a systemically translocatable organic metal chelate of a metal selected from the group consisting of cadmium and silver and an organic compound selected from the group consisting of
   (I) polyketones selected from the group consisting of acetylacetone, diacetyl, 2,4-diketohexane, 2,4-diketooctane, 2,4-diketodecane, 2,4-diketododecane, 2,4-diketotetradecane, 2,4-diketohexadecane, 2,4-diketooctadecane;
   (II) amino carboxylic acids selected from the group consisting of ethylenediaminetetraacetic acid, diethylenetriamine pentaacetic acid, N-(β-hydroxyethyl) ethylenediamino triacetic acid, N,N-(β-hydroxyethyl) ethylenediamino diacetic acid, nitrilotriacetic acid, glutamic acid, aspartic acid, pyrrolidonecarboxylic acid;
   (III) the sodium salt of the amino carboxylic acids of (II);
   (IV) the potassium salt of the amino carboxylic acids of (II); and
   (V) the ammonium salt of the amino carboxylic acids of (II).

2. A plant systemic nematocidal composition comprising a solid, inert physiologically compatible carrier and a non-phytotoxic nematocidally effective quantity of cadmium acetylacetonate.

3. A plant systemic nematocidal composition comprising a solid, inert physiologically compatible carrier and a non-phytotoxic nematocidally effective quantity of silver acetylacetonate.

4. A plant systemic nematocidal composition comprising a solid, inert physiologically compatible carrier and a non-phytotoxic nematocidally effective quantity of cadmium–EDTA.

5. A plant systemic nematodical composition comprising a solid, inert physiologically compatible carrier and a non-phytotoxic nematocidally effective quantity of silver–EDTA.

6. A method for protecting growing plants from parasitic nematocidal attack which comprises applying to said plant a non-phytotoxic nematocidally effective quantity of a systemically translocatable organic metal chelate of a metal selected from the group consisting of cadmium and silver and an organic compound selected from the group consisting of
   (I) polyketones selected from the group consisting of acetylacetone, diacetyl, 2,4-diketohexane, 2,4-diketooctane, 2,4-diketodecane, 2,4-diketododecane, 2,4-diketotetradecane, 2,4-diketohexadecane, 2,4-diketooctadecane;
   (II) amino carboxylic acids selected from the group consisting of ethylenediaminetetraacetic acid, diethylenetriamine pentaacetic acid, N-(β-hydroxyethyl) ethylenediamino triacetic acid, N,N,-bis(β-hydroxyethyl) ethylenediamino diacetic acid, nitrilotriacetic acid, glutamic acid, aspartic acid, pyrrolidonecarboxylic acid;
   (III) the sodium salt of the amino carboxylic acids of (II);
   (IV) the potassium salt of the amino carboxylic acids of (II); and
   (V) the ammonium salt of the amino carboxylic acids of (II).

7. A method for protecting growing plants from parasitic nematode attack which comprises spraying the foliage and stems of said plants with a composition comprising a physiologically compatible carrier and a non-phytotoxic nematocidally effective quantity of a systemically translocatable organic metal chelate of a metal selected from the group consisting of cadmium and silver and an organic compound selected from the group consisting of
   (I) polyketones selected from the group consisting of acetylacetone, diacetyl, 2,4-diketohexane, 2,4-diketooctane, 2,4-diketodecane, 2,4-diketododecane, 2,4-diketotetradecane, 2,4-diketohexadecane, 2,4-diketooctadecane;
   (II) amino carboxylic acids selected from the group consisting of ethylenediaminetetraacetic acid, diethylenetriamine pentaacetic acid, N-(β-hydroxyethyl) ethylenediamino triacetic acid, N,N-bis(β-hydroxyethyl) ethylenediamino diacetic acid, nitrilotriacetic acid, glutamic acid, aspartic acid, pyrrolidonecarboxylic acid;
   (III) the sodium salt of the amino carboxylic acids of (II);
   (IV) the potassium salt of the amino carboxylic acids of (II); and
   (V) the ammonium salt of the amino carboxylic acids of (II).

8. A method for protecting growing plants against parasitic nematode attack which comprises spraying on the leaves and stems of said plants a composition comprising a physiologically compatible carrier and a non-phytotoxic nematocidally effective quantity of cadmium acetylacetonate.

9. A method for protecting growing plants against parasitic nematode attack which comprises spraying on the leaves and stems of said plants a composition comprising a physiologically compatible carrier and a non-phytotoxic nematocidally effective quantity of silver acetylacetonate.

10. A method for protecting growing plants against parasitic nematode attack which comprises spraying on the leaves and stems of said plants a composition comprising a physiologically compatible carrier and a non-phytotoxic nematocidally effective quantity of cadmium–EDTA.

11. A method for protecting growing plants against parasitic nematode attack which comprises spraying on the leaves and stems of said plants a composition comprising a physiologically compatible carrier and a non-phytotoxic nematocidally effective quantity of silver–EDTA.

12. A composition according to claim 1 wherein said organic metal chelate is silver-pyrrolidone carboxylic acid.

13. A composition according to claim 1 wherein said organic metal chelate is a cadmium-pyrrolidone carboxylic acid.

14. A method according to claim 6 wherein said organic metal chelate is silver-pyrrolidone carboxylic acid.

15. A method according to claim 6 wherein said organic metal chelate is cadmium-pyrrolidone carboxylic acid.

References Cited by the Examiner

UNITED STATES PATENTS 2,564,855  8/1951  Neff et al. _____ 167—22

(References on following page)

UNITED STATES PATENTS

| | | | |
|---|---|---|---|
| 2,659,711 | 11/1953 | Wilkins et al. | 260—429 |
| 2,696,455 | 12/1954 | Blair | 167—53.1 |
| 2,797,182 | 6/1957 | Guthrie | 167—53 |
| 2,868,724 | 1/1959 | Zech | 167—65 |
| 2,933,475 | 4/1960 | Hoover et al. | 260—429 |
| 3,086,907 | 4/1963 | Hessel | 167—39 |
| 3,157,682 | 11/1964 | Ramsden | 260—429 |

OTHER REFERENCES

Journal Chem. Soc., vol. 105 (1914), pp. 194–196.

Martell et al.: "Chemistry of the Metal Chelate Compounds," Prentice-Hall Inc., Englewood Cliffs, New Jersey, 1957, pp. 477, 478, 490, 537, 538.

JULIAN S. LEVITT, *Primary Examiner.*

G. A. MENTIS, *Assistant Examiner.*